Dec. 23, 1941.   C. W. HOLMQUIST   2,266,972
METHOD OF MAKING COMPOSITE SHEETS
Filed July 23, 1940   3 Sheets-Sheet 1
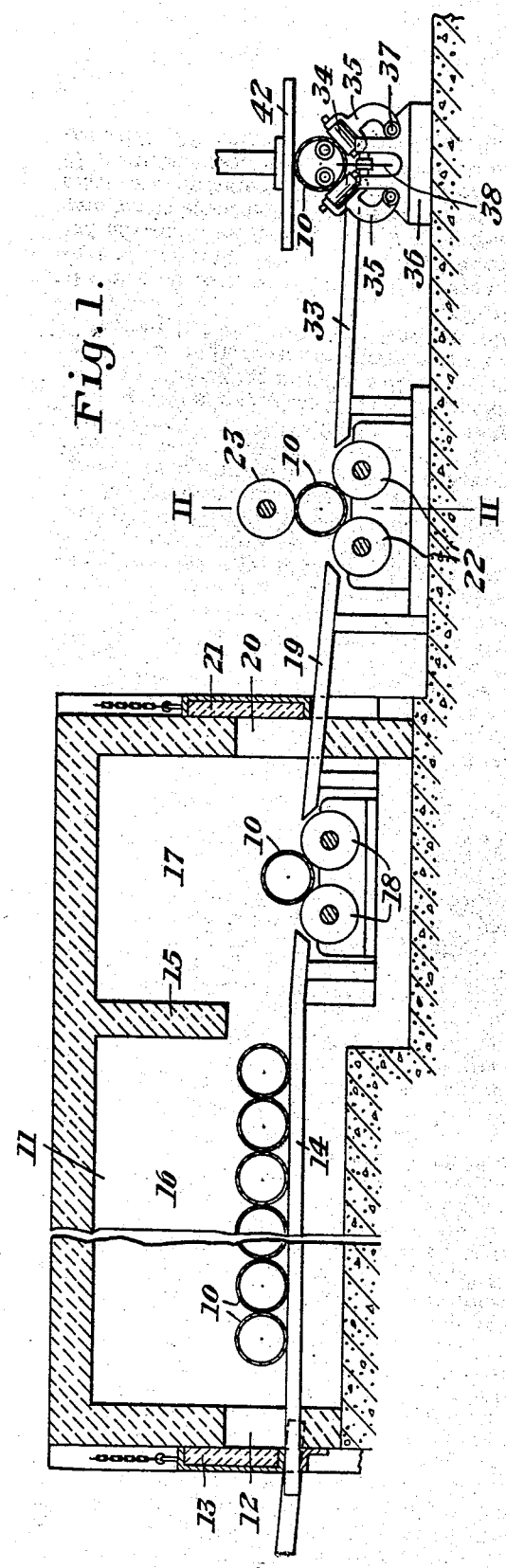
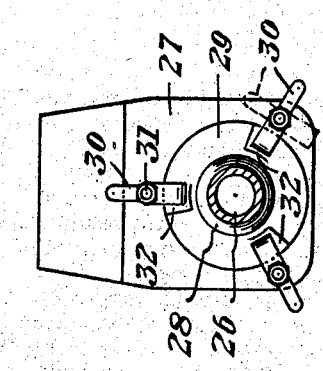
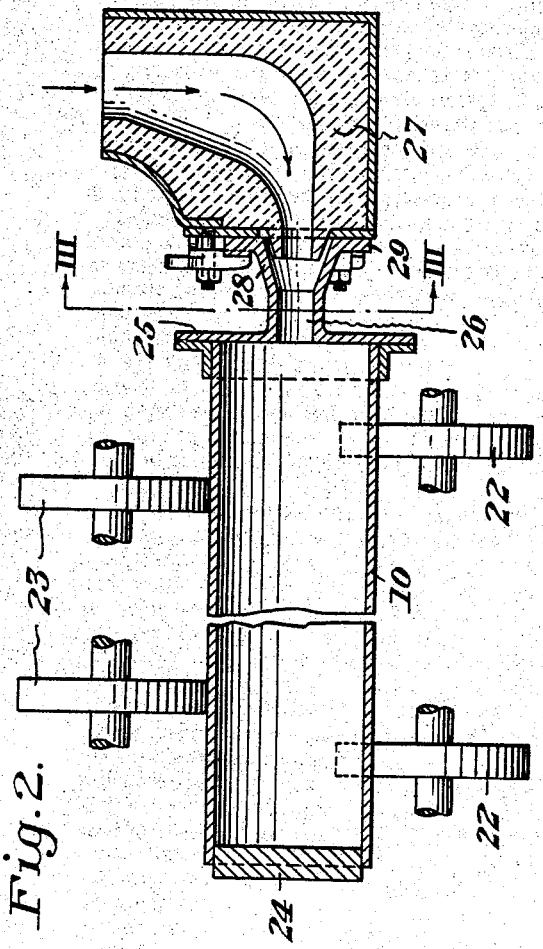
INVENTOR
Carl W. Holmquist
by his attorneys
Stebbins and Blenko Dec. 23, 1941.                     C. W. HOLMQUIST                     2,266,972
                          METHOD OF MAKING COMPOSITE SHEETS
                                Filed July 23, 1940                 3 Sheets-Sheet 2
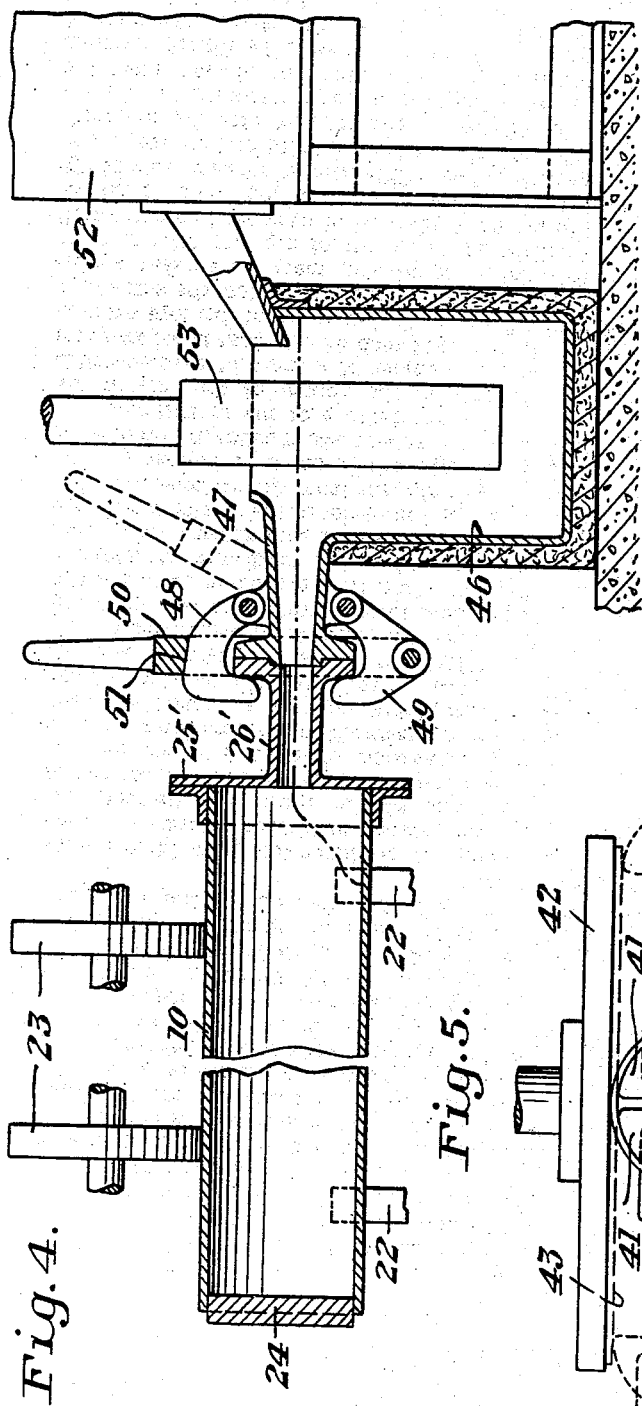
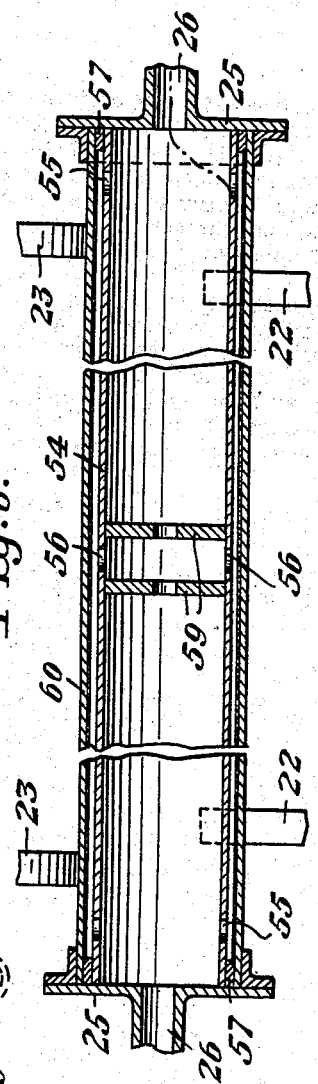
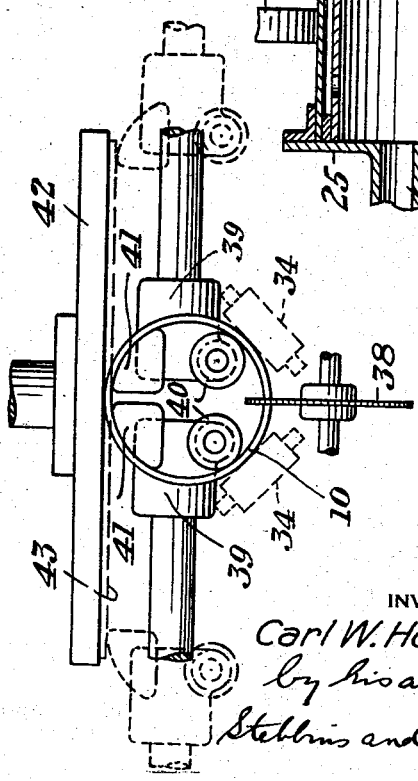
INVENTOR
Carl W. Holmquist
by his attorneys
Stebbins and Blenko Dec. 23, 1941.   C. W. HOLMQUIST   2,266,972
METHOD OF MAKING COMPOSITE SHEETS
Filed July 23, 1940   3 Sheets-Sheet 3

INVENTOR
Carl W. Holmquist
by his attorneys
Stebbins and Blenko

Patented Dec. 23, 1941

2,266,972

UNITED STATES PATENT OFFICE 2,266,972

METHOD OF MAKING COMPOSITE SHEETS

Carl W. Holmquist, Warren, Ohio, assignor to Copperweld Steel Company, Glassport, Pa., a corporation of Pennsylvania Application July 23, 1940, Serial No. 346,969

10 Claims. (Cl. 29—189)

This invention relates to the manufacture of composite or bi-metallic articles and, in particular, to the manufacture of composite sheets comprising a sheet of base metal and a sheet of cladding metal on one or both sides thereof and integrally united therewith.

It has been proposed heretofore to produce bi-metallic sheets by casting a relatively thick layer of a protective metal such as copper on a relatively thick slab of base metal such as steel, in such manner as to effect a weld therebetween and then rolling the resulting slab to plates and sheets. This method of producing copper-clad steel sheets is characterized by a serious objection. The copper is more plastic than the steel at temperatures suitable for rolling and, as a result, considerable copper is rolled off the slab as the leading end enters the pass of a rolling mill, and the amount rolled off is proportionate to the initial thickness of the copper layer.

I have invented a novel method for the manufacture of composite sheets which overcome the aforementioned objection to the previous method. In a preferred practice of the invention, I provide a break-down suitable for the rolling of copper-clad sheets by applying a copper lining to a steel tube, cutting the tube into suitable lengths, slitting the lengths longitudinally and opening them to the flat condition. By this procedure, I am able to produce a break-down for the rolling of copper-clad steel sheets, composed of a relatively thin layer of copper welded to a relatively thin plate of steel. When such a break-down is rolled, the loss of copper by rolling off at the leading end is minimized. As a result, the amount of scrap resulting from the processing is reduced or conversely, the percentage of prime material turned out is increased.

My invention contemplates a novel method for applying a layer of cladding metal to the interior and exterior of a tube of base metal and for slitting and opening the resulting composite tubes. Further details and novel features of the invention will be fully described and explained hereinafter, with reference to the accompanying drawings illustrating my preferred embodiment and practice with certain modifications. In the drawings:

Fig. 1 is a diagrammatic view partly in section and partly in end elevation showing a portion of the apparatus which I contemplate for the lining of tubes of base metal such as steel with a layer of cladding metal such as copper;

Fig. 2 is a longitudinal section taken along the plane of line II—II of Fig. 1;

Fig. 3 is a sectional view taken along the plane of line III—III of Fig. 2, showing parts in elevation;

Fig. 4 is a view similar in general to Fig. 2 showing a modified form of apparatus;

Fig. 5 is a view to enlarged scale showing a portion of the apparatus illustrated in Fig. 1;

Fig. 6 is a sectional view similar to Fig. 2 showing a slightly modified practice;

Figure 7:
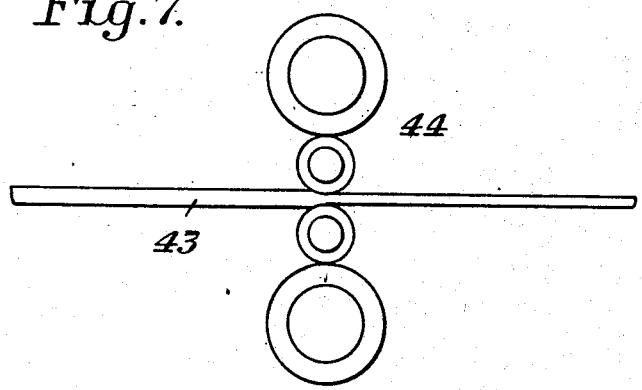
Fig. 7 is a diagrammatic view illustrating the conversion of a break-down into sheets.

Referring now in detail to the drawings and, for the present, to Figs. 1 through 3, I charge tubes 10 of base metal into a heating furnace 11 which may conveniently be provided with a charging port 12 and a door 13. The hearth of the furnace may be provided with supporting rails 14. The furnace is preferably divided, as by a baffle wall 15, into heating and fluxing chambers 16 and 17, respectively.

The tubes 10 are preferably of steel and may be produced by any suitable method, i. e., they may be seamless tubes or welded tubes. After being charged into the furnace, the tubes are moved along the rails 14 and are progressively heated. When the tube nearest the fluxing chamber has been heated to a suitable temperature, say about 2300° F., it is discharged, for example, by operating retractible stops normally effective to hold the tubes in the heating chamber. The leading tube, when released, rolls down the rails 14 and onto supporting rolls 18 in the fluxing chamber. These rolls may be mounted in any suitable manner and are arranged to be driven. While the heated tube is on the rolls 18, I deposit suitable fluxing material therein, such as $ZnNH_3Cl_2$. Any convenient means may be utilized for introducing the fluxing material into the tube. The rolls 18 are then driven to rotate the tube so that the fluxing material will be distributed substantially uniformly over the interior thereof. The tube is then ready to be discharged from the furnace and to receive a charge of cladding metal.

The fluxing chamber 17 is provided with suitable kick-off arms (not shown) which, when operated, discharge the tube onto rails 19 along which the tube rolls out of the furnace through a discharge port 20 normally covered by a door 21. From the rails 19, the tube is discharged onto supporting rolls 22. The rolls 22 are similar in general to the rolls 18 and are adapted to be driven to rotate the tube about its axis. If desired, hold-down rolls 23 may also be employed to hold the tube on the rolls 22. The rolls 23 are mounted for vertical adjustment and are retracted when a tube is being discharged from the furnace.

When the tube has arrived at the rolls 22, a closure 24 is fitted into one end thereof. This may be a refractory plug or disc of suitable dimensions. A closure 25 having an inlet 26 therein is attached to the other end of the tube. If desired, however, the closures 24 and 25 may be applied to the tubes before they are charged into the furnace 11. In either case, at the proper time, a pouring gate 27 is attached to the inlet 26. I provide quickly detachable means on the gate for engaging the inlet. The inlet has a flaring outer end 28 and a radial flange 29. The gate 27 is provided with manually operable camming levers 30 pivoted thereon as at 31 and adapted to cooperate with cam surfaces 32 formed on the flange 29.

When the gate 27 has been attached as described, a suitable charge of cladding metal such as copper is poured into the gate and flows therefrom into the tube supported on the rolls 22. When the necessary amount of cladding metal has been charged into the tube, the pouring gate is disconnected and the inlet 26 closed as by means of a suitable plug driven into the flaring outer end 28 thereof.

The tube is then rotated by driving the rolls 22. The cladding metal is thereupon distributed by centrifugal force substantially uniformly over the interior of the tube. Rotation of the tube is continued until the cladding metal solidifies. By reason of the elevated temperature of the tube and the molten condition of the cladding metal itself, the latter is firmly welded to the interior of the tube and, when cooled, constitutes an integrally bonded lining therein.

When the lining of cladding metal has become welded to the interior of the tube and solidified, the tube is discharged from the rolls 22 by suitable kick-off arms (not shown) after the rolls 23 have been retracted. The composite tube which is still at a temperature at which it is plastic rolls along rails 33 and is delivered thereby to a roll-table 34. The rolls of the table 34 opposite the rolls 22 are preferably mounted on tilting brackets 35 pivoted to a base 36 as at 37. By this construction, the rolls of the table 34 on the side nearer the rolls 22 may be moved out of the way of a tube advancing down the rails 33. When the tube has reached the table 34, the rolls thereof which were moved out of the way are restored to their illustrated position and the tube is then moved along the table by any convenient means, into engagement with a hot saw 38 or other convenient means for slitting the tube longitudinally. If desired, the tube may be cut up into portions of suitable length before slitting. In any case, the ends of the tubes with which the closures 24 and 25 were in contact, are removed to provide finished edges.

After slitting, the tube or a portion of the length thereof is opened and flattened by the apparatus shown in Fig. 5. As there illustrated, a pair of spaced retractible heads 39 are mounted adjacent the roll-table 34 for lateral movement toward and from the centerline thereof. Each head has a roller 40 and a shoe 41 adapted to engage the interior of the tube. There are two pairs of heads 39, one of which is shown in Fig. 5, for engagement with the two ends of the tube or a portion thereof. One of the pairs of heads and its actuating mechanism, furthermore, is constructed for movement longitudinally of the tube whereby it may be brought into engagement therewith after one end of the tube has been positioned against the other pair of heads. With the two pairs of heads in engagement with the tube, the heads are retracted from the centerline of the roll-table 34 by suitable actuating means (not shown). A platen 42 is supported above the table 34 and is mounted for vertical reciprocation. It is brought down into engagement with the tube before the separating movement of the heads commences. As the heads separate, the rolls of the table 34 are swung down. The movement of the rolls 40 on the heads 39 opens up the tube at the longitudinal slit therein while the shoes 41 flatten the tube by ironing it out against the platen 42. This flattening operation is preferably carried out while the composite tube is still at an elevated temperature such that it does not offer great resistance to deformation.

The flattening of the tube or a portion of the length thereof, as above described, provides a break-down 43 which may be readily reduced to sheet form. If the tube was not severed into portions before flattening, the composite plate 43 may be sheared transversely to provide sheet bars for individual rolling. The plate 43 may also be reduced in one piece by rolling after suitable reheating, if necessary.

Fig. 7 illustrates diagrammatically the hot rolling of the break-down 43 in a mill 44. I limit the amount of cladding metal charged into the tube so that only a relatively thin layer thereof is welded to the base metal. In general, the layer of cladding metal should not be thicker than the base metal and in most cases only from 5% to 50% of the thickness of the base metal.

Sheet bars sheared from the break-down 43 may be reduced to sheet form by hot rolling according to the usual practice.

Figure 8:
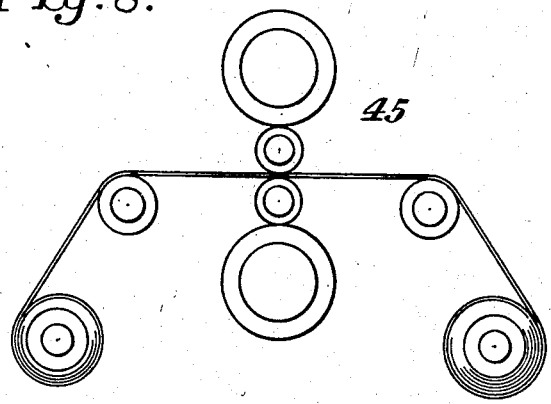
Fig. 8 is a diagrammatic view illustrating the rolling of such elongated break-down into strip.

When the break-down 43 has been reduced to intermediate gauge by rolling in the mill 44, it may be coiled and then further reduced by cold rolling in a mill 45 shown in Fig. 8, under tension. Instead of a single-stand reversing mill such as shown in Fig. 8, the cold reduction of the hot rolled strip may be effected in a multi-stand continuous mill.

A modified form of apparatus for charging a predetermined amount of molten cladding metal into the tube is illustrated in Fig. 4. It comprises a receptacle or pot 46 having a spout 47 extending laterally therefrom. The spout is adapted to be connected to the inlet 26' of a closure 25' on one end of the tube. The parts just mentioned are similar in general to the closure 25 and its inlet 26. Hooks 48 and 49 are pivoted on the spout 47 and are adapted to engage around a radial flange on the inlet 26'. A yoke 50 is pivoted on the hook 49 and is adapted to engage a cam surface 51 on the hook 48. When the yoke is in the position in which it is shown in solid lines, the hooks 48 and 49 grip the radial flange on the inlet 26' and hold it firmly against the end of the spout 47 which is shaped for cooperation with the end of the inlet. When the yoke 50 is shifted to the position shown in chain lines, the hooks are free for tilting to permit disengagement of the inlet 26 from the spout 47.

The pot 46 receives copper from a melting furnace 52 and is provided with a displacement piston 53 mounted for vertical reciprocation. For a given starting level of the copper in the pot 46, a predetermined descent of the piston 53 will displace a definite amount of copper into the tube 10.

Fig. 6 illustrates the practice for applying cladding metal to both sides of a tube. As there illustrated, a tube 54, of steel, for example, has radial holes 55 drilled therein adjacent each end and holes 56 adjacent the middle. End rings 57 are applied to the tube and it is then pickled. Transverse partitions 59 are then positioned adjacent the holes 56.

The tube 54 prepared as described above, is then enclosed in a mold 60 which may conveniently be an outer tube having a thin lining of refractory material, such as graphite, vitreous enamel, aluminum oxide, etc. A closure 25 is then applied to each end of the mold 60 and the entire assembly heated to the proper temperature and placed on the rolls 22. Molten copper is charged through the inlets 26 in the manner previously described and the tube and mold rotated by driving the rolls 22. The molten copper in each end of the tube is driven out through the holes 55 by centrifugal force. Any gases trapped by the copper flowing into the space between the tube 54 and the mold 60 are vented through the holes 56 and the holes in the partitions 59. The amount of copper charged into each end of the tube is such as to fill the space between the tube and the mold with enough additional to form a layer of the desired thickness inside the tube.

When the cladding metal has solidified and the entire tube cooled sufficiently, the mold 60 may be expanded by reeling to permit removal of the tube 50 with its cladding layers both inside and out. The resulting tube may then be slit longitudinally, flattened and rolled to provide composite sheets comprising a base metal, for example, steel, with a cladding layer, for example, copper, on both sides thereof.

Figure 9:
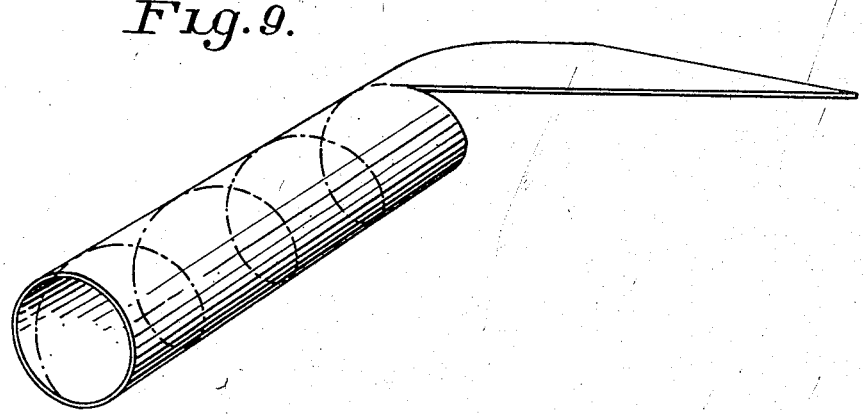
Fig. 9 is a perspective view showing how an elongated break-down may be obtained from a tube lined according to my invention, which is adapted to be rolled down into strip.

Instead of slitting a composite tube longitudinally before flattening, I may cut the tube wall along a helix, as shown in Fig. 9, in order to obtain a break-down of relatively great length which may be desirable for certain purposes.

It will be apparent from the foregoing description that my invention provides a breakdown from which composite or bi-metallic sheets or strip may readily be rolled, as well as a method for the manufacture of such break-down. The operations involved are simple and may be readily carried out. The special apparatus described is also simple and relatively inexpensive in construction. It is possible therefore, by my invention, to produce composite sheets of uniform high quality at low cost. Such sheets are useful in numerous applications where special properties of the cladding metal, such as corrosion resistance, are desirable but the cost of a sheet composed entirely of the cladding metal is objectionable. The composite sheet, of course, has the advantage of the strength of the base metal such as steel, in addition to the special properties of the cladding metal.

Although I have illustrated and described but a preferred practice of the invention, it will be understood that changes in the procedure disclosed may be made without departing from the spirit of the invention or the scope of the appended claims.

I claim:

1. In a method of making composite material comprising a metal base and a cladding metal thereon, the steps including disposing a tube of the base metal substantially horizontally and rotating the tube with molten cladding metal therein, thereby welding to the interior of the tube a lining of the cladding metal, splitting and flattening the lined tube and rolling the resulting product to the desired gauge.

2. In a method of making composite material comprising a metal base and a cladding metal thereon, the steps including disposing a tube of the base metal substantially horizontally, heating the tube, delivering molten cladding metal thereto and rotating the tube, thereby welding a lining of the cladding metal to the interior of the tube, splitting and flattening the lined tube and rolling the resulting product.

3. In a method of making composite material comprising a metal base and a cladding metal thereon, the steps including disposing a tube of the base metal substantially horizontally, placing a charge of the cladding metal in the tube and rotating the tube, thereby welding to the interior of the tube a lining of the cladding metal, splitting and flattening the lined tube and rolling the resulting product to the desired gauge.

4. In a method of making composite material comprising a metal base and a cladding metal thereon, the steps including providing a tube of the base metal, rotating the tube with a charge of molten cladding metal therein, thereby welding a layer of cladding metal to the interior of the tube by centrifugal force, and splitting and opening the tube.

5. In a method of making composite material comprising a metal base and a cladding metal thereon, the steps including disposing a tube of the base metal substantially horizontally, heating the tube, delivering molten cladding metal thereto and rotating the tube, thereby welding a lining of the cladding metal to the interior of the tube, and splitting and opening the lined tube.

6. In a method of making composite material comprising a metal base and a cladding metal thereon, the steps including disposing a tube of the base metal substantially horizontally, placing a charge of the cladding metal in the tube and rotating the tube, thereby welding a layer of cladding metal to the interior of the tube by centrifugal force, and splitting and opening the tube.

7. In a method of making composite material comprising a metal base and a cladding metal on both sides thereof, the steps including providing a tube of the base metal with radial ports, disposing said tube centrally within a refractory-lined tube having an inside diameter greater than the outside diameter of said first-mentioned tube, blocking the space between the tubes adjacent the ends thereof, rotating said tubes with molten cladding metal therein thereby welding a layer of cladding metal to the exterior and interior of said first-mentioned tube, reeling the composite tube thus formed to expand the refractory-lined tube, removing the first-mentioned tube therefrom, and splitting and opening it.

8. In a method of making composite material comprising a metal base and a cladding metal on both sides thereof, the steps including providing a tube of the base metal, disposing said tube centrally within a refractory-lined tube having an inside diameter greater than the outside diameter of said first-mentioned tube, blocking the space between the tubes adjacent the ends thereof, rotating said tubes with molten cladding metal therein thereby welding a layer of cladding metal to the exterior and interior of said first-mentioned tube, expanding the refractory-lined tube, removing therefrom the first-mentioned tube, and splitting and opening the latter.

9. In a method of lining tubes with a cladding metal, the steps including heating the tube, applying welding flux to the tube, closing the ends of the tube, charging molten cladding metal into the tube and rotating the tube to cause the cladding material to be substantially uniformly distributed over the interior of the tube.

10. In a method of lining tubes with a cladding metal, the steps including heating the tube, applying welding flux to the tube, closing the ends of the tube, charging molten cladding metal into the tube by positive displacement from a reservoir thereof, and rotating the tube to cause the cladding material to be substantially uniformly distributed over the interior of the tube.

CARL W. HOLMQUIST.